(12) United States Patent
Lesartre et al.

(10) Patent No.: US 9,053,072 B2
(45) Date of Patent: Jun. 9, 2015

(54) END NODE TRANSACTIONS AT THRESHOLD-PARTIAL FULLNESS OF STORAGE SPACE

(75) Inventors: Gregg B. Lesartre, Fort Collins, CO (US); Michael J Phelps, Cheyenne, WY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1405 days.

(21) Appl. No.: 11/626,887

(22) Filed: Jan. 25, 2007

(65) Prior Publication Data

US 2008/0184259 A1    Jul. 31, 2008

(51) Int. Cl.
G06F 15/173    (2006.01)
H04L 12/26     (2006.01)
G06F 11/20     (2006.01)

(52) U.S. Cl.
CPC .................................. *G06F 11/2007* (2013.01)

(58) Field of Classification Search
USPC ................. 709/230–237, 217–219, 238–244; 370/229–270
See application file for complete search history.

(56) References Cited

U.S. PATENT DOCUMENTS

| | | | |
|---|---|---|---|
| 6,065,063 A | 5/2000 | Abali | |
| 6,088,716 A | 7/2000 | Stanfill et al. | |
| 6,202,112 B1 | 3/2001 | Gadagkar et al. | |
| 6,466,835 B1 | 10/2002 | Ishizawa et al. | |
| 6,490,630 B1 | 12/2002 | Poon et al. | |
| 6,507,861 B1 | 1/2003 | Nelson et al. | |
| 6,567,856 B1 | 5/2003 | Steele, Jr. et al. | |
| 6,651,124 B1 | 11/2003 | McAllister | |
| 6,671,255 B1 * | 12/2003 | Buhrgard et al. | 370/230 |
| 6,671,275 B1 | 12/2003 | Wong et al. | |
| 6,738,871 B2 | 5/2004 | Van Huben et al. | |
| 6,738,872 B2 | 5/2004 | Van Huben et al. | |
| 6,865,634 B2 | 3/2005 | McAllister | |
| 6,938,094 B1 | 8/2005 | Keller et al. | |
| 6,983,461 B2 | 1/2006 | Hutchison et al. | |
| 6,992,988 B2 | 1/2006 | Reynders et al. | |
| 2002/0176363 A1 * | 11/2002 | Durinovic-Johri et al. | 370/237 |
| 2002/0194377 A1 | 12/2002 | Doolittle et al. | |
| 2003/0172180 A1 | 9/2003 | Reynders et al. | |
| 2003/0174653 A1 | 9/2003 | Basu et al. | |
| 2003/0210685 A1 | 11/2003 | Foster et al. | |
| 2004/0076122 A1 | 4/2004 | Wittorff | |
| 2004/0078482 A1 * | 4/2004 | Blumrich et al. | 709/238 |
| 2004/0083321 A1 | 4/2004 | McAllister | |
| 2004/0184402 A1 * | 9/2004 | Alicherry et al. | 370/216 |
| 2005/0025141 A1 | 2/2005 | Chao et al. | |
| 2005/0030963 A1 | 2/2005 | Solomon et al. | |

(Continued)

OTHER PUBLICATIONS

William J. Dally, Virtual Channel Flow Control, IEEE Transactions of Parallel and Distributed Systems, vol. 3, No. 2, Mar. 1992, pp. 194-205.

(Continued)

*Primary Examiner* — Afshawn Towfighi
(74) *Attorney, Agent, or Firm* — Wood Phillips

(57) ABSTRACT

An upstream-communication end node of an apparatus in an example upon a receipt of an indication of threshold-partial fullness of transaction-storage space on a downstream-communication end node modifies transaction-selection for delivery to the downstream-communication end node to exclude one or more transactions originated on the upstream-communication end node.

18 Claims, 5 Drawing Sheets

(56) References Cited

U.S. PATENT DOCUMENTS

| | | |
|---|---|---|
| 2005/0067493 A1 | 3/2005 | Urken |
| 2006/0026294 A1* | 2/2006 | Virdi et al. .................... 709/232 |
| 2006/0095552 A1 | 5/2006 | Dini et al. |
| 2006/0156308 A1 | 7/2006 | Jarvis et al. |
| 2007/0115826 A1* | 5/2007 | Chow ........................... 370/235 |
| 2008/0025209 A1* | 1/2008 | Banner et al. ................. 370/228 |

OTHER PUBLICATIONS

William Yurcik, David Tipper, and Deepankar Medhi, The Use of Hop-Limits to Provide Survivable ATM Group Communications, 2nd Annual Workshop on Networked Group Communications, Nov. 8-10, 2000, Palo Alto, CA.

Microsoft TechNet, Network Discovery (SMS 2003 Concepts Planning and Deployment Guide), http://www.microsoft.com/technet/prodtechnol/sms/sms2003/cpdg/plan3980.mspx?pf=true, Dec. 7, 2006 (5 pgs.).

Network Topology—Wikipedia.org/wiki/Network_topology, Dec. 6, 2006 (3 pgs.).

Chapter 5, Concurrent VLSI Architecture Group, Retrieved Mar. 27, 2015, 10 pages.

Sebastian Orlowski et al. The Effect of Hop Limits on Optimal Cost in Survivable Network Design, Retrieved Mar. 27, 2015, 13 Pages.

* cited by examiner

END NODE TRANSACTIONS AT THRESHOLD-PARTIAL FULLNESS OF STORAGE SPACE

BACKGROUND

In a large computer system, protocol agents such as processors and memory communicate through an interconnect fabric. These communications can comprise transactions such as requests for data, returns of requested data, interrupts, and status updates. A "star" organization of such a fabric comprises endpoint nodes that communicate their transactions to a central switch complex that in turn routes the transactions to a targeted endpoint node. A "grid" organization of a fabric comprises communication from a node through a number of peer intermediate nodes and to the targeted destination node. In the grid, transactions can be routed between and through nodes, rather than requiring switches and dedicated links to the switches, in contrast to the "star" configuration.

Typical system fabrics can group communications into different flow control classes that allow transactions of different types to pass one another at system nodes. The system employs the flow control classes for the communications to avoid "deadlock" and/or "gridlock" conditions. A deadlock condition would exist in the system fabric if a first transaction could not be completed because the transaction is behind a second transaction that will not be accepted by a node until the first transaction has been completed.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, to be able to avoid deadlocks and/or gridlocks, system fabrics organized as a grid typically require more flow control classes in comparison to system fabrics organized as a star. With such an increase in the number of flow control classes, systems generally require more area and complexity for implementation of the queuing structures for communicating the transactions. The additional area and complexity could comprise additional buffering and control to manage the buffering. Some implementations could require time sharing between different virtual channels. Another implementation could comprise active, increased, and/or enhanced management of time sharing between different virtual channels. For example, different buffers could hold different transactions depending on the nature of the next hops in the communication.

A grid configuration, for example, typically requires added flow control classes to implement a fabric that may avoid deadlocks. With an increase in the number of flow control classes, systems generally require more area and complexity for implementation of the queuing structures in the fabric infrastructures. So, the nodes and possible switches in a grid topology may become more expensive to implement.

An exemplary computer system fabric avoids deadlock and/or gridlock cycles. An exemplary implementation avoids deadlocks in a computer interconnect fabric in a way that avoids a need for additional queuing channels that would otherwise result in increased size, complexity, consumption of materials, and/or cost. An exemplary system topology comprises lower complexity for switch components with positive comparison to star configurations, and supports routing of transactions through other active nodes with positive comparison to grid configurations. An exemplary implementation comprises relatively fewer and lower-cost switch components. An exemplary topology comprises an option of a node routing through another node with positive comparison to a grid style topology, without requiring more flow control classes than in an exemplarily comparative star configuration.

Figure 1:
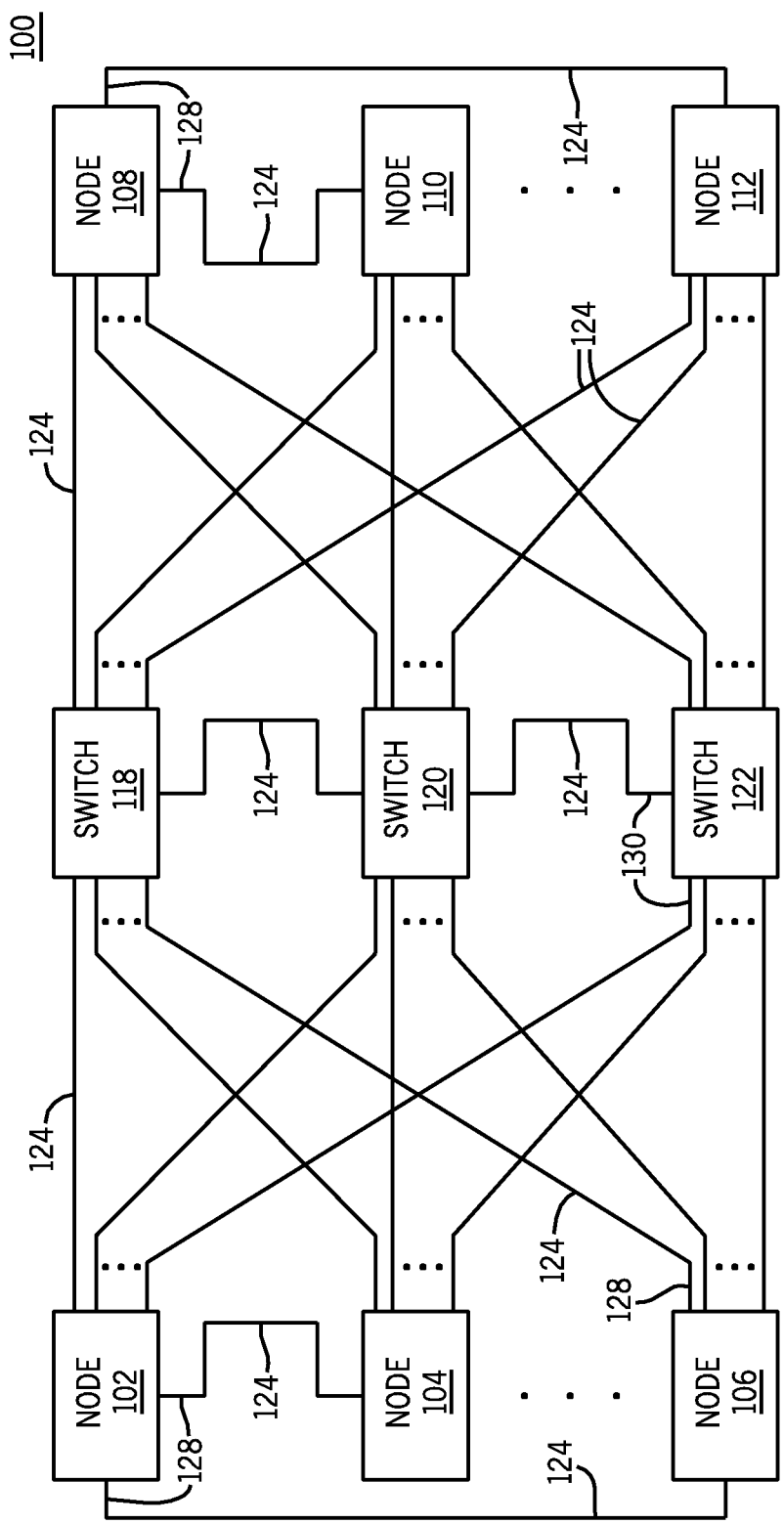
FIG. 1 is a representation of an implementation of an apparatus that comprises a plurality of nodes and zero or more switch components that communicate over a plurality of paths according to one preferred embodiment of the invention.

Turning to FIG. 1, an implementation of an apparatus 100 in an example comprises a computer and/or communication system, network, and/or fabric. An exemplary apparatus 100 comprises a plurality of nodes such as nodes 102, 104, 106, 108, 110, 112 and zero or more switch components and/or nodes such as switches 118, 120, 122 that communicate over a plurality of paths, for example, one or more paths 124. An exemplary path 124 comprises a bidirectional communication link and/or path. The communication among the nodes 102, 104, 106, 108, 110, 112 and switches 118, 120, 122 in an example comprises transactions, data, traffic, and/or information such as requests for data, returns of requested data, interrupts, and/or status updates.

The node 102 in an example comprises an end node, endpoint node, and/or destination of data traveling through a fabric. An end node as the node 102 in an example is capable of serving as a final destination of a transaction if the transaction is targeted to the end node. In a further example, an end node as the node 102 may forward a transaction to a subsequent end node that is targeted by a transaction. For example, the node 102 as an end node may comprise an intermediately-located end node that forwards data but is not an end destination of the particular data, but could serve as an end destination of other data targeted for the node 102. The node 102 in an example serves as any of an end node and/or an intermediately-located end node, for example, depending on whether the data is destined for the node 102 or a subsequent node. An exemplary node 102 comprises one or more ports 128. An exemplary port 128 is coupled with exactly one path 124. An exemplary path 124 comprises a link between exactly two end nodes such as nodes 102 and 104, exactly one end node and exactly one switch node such as node 102 and switch 118, or exactly two switches nodes such as switches 118 and 120.

The node 102 in an example comprises a selected and/or desirable functional and/or operational logic block, for example, that performs a computer-related task. For example, the node 102 may comprise one or more processors, memory blocks, and/or I/O blocks. The node 102 in an example comprises an algorithm, procedure, program, process, mechanism, engine, model, coordinator, module, application, code, and/or logic. Additional illustrative details of an exemplary implementation of the node 102 are presented herein.

The switch 118 in an example comprises a switch node that serves to provide signal switching capability among the nodes 102, 104, 106, 108, 110, 112 and/or the switches 120, 122. The switch 118 in an example comprises an intermediate node that forwards data but is not an end destination of the data. In a further example, the switch 118 serves as only an intermediate node, for example, and receives data that is destined for a subsequent node such as an end node, for example, the node 102. The switch 118 in an example is incapable of serving as an end destination of data even if the data hypothetically were targeted for the switch 118 as the end destination of the data. An exemplary switch 118 comprises one or more ports 130. The switch 118 in an example comprises a switch that allows simultaneous connections among the nodes 102, 104, 106, 108, 110, 112 and/or the switches 120, 122. One or more exemplary implementations may comprise a selected and/or desirable number, or omission, of switches 118, 120, 122. One or more exemplary implementations may comprise a selected, desirable, greater, lesser, or substantially equal number of switches 118, 120, 122, for example, arranged in series or in parallel and/or a combination of or exclusive employment of serial and/or parallel arrangements. One or more exemplary implementations may comprise no switches 118, 120, 122, for example, with only direct connections among the nodes 102, 104, 106, 108, 110, 112.

Figure 2:
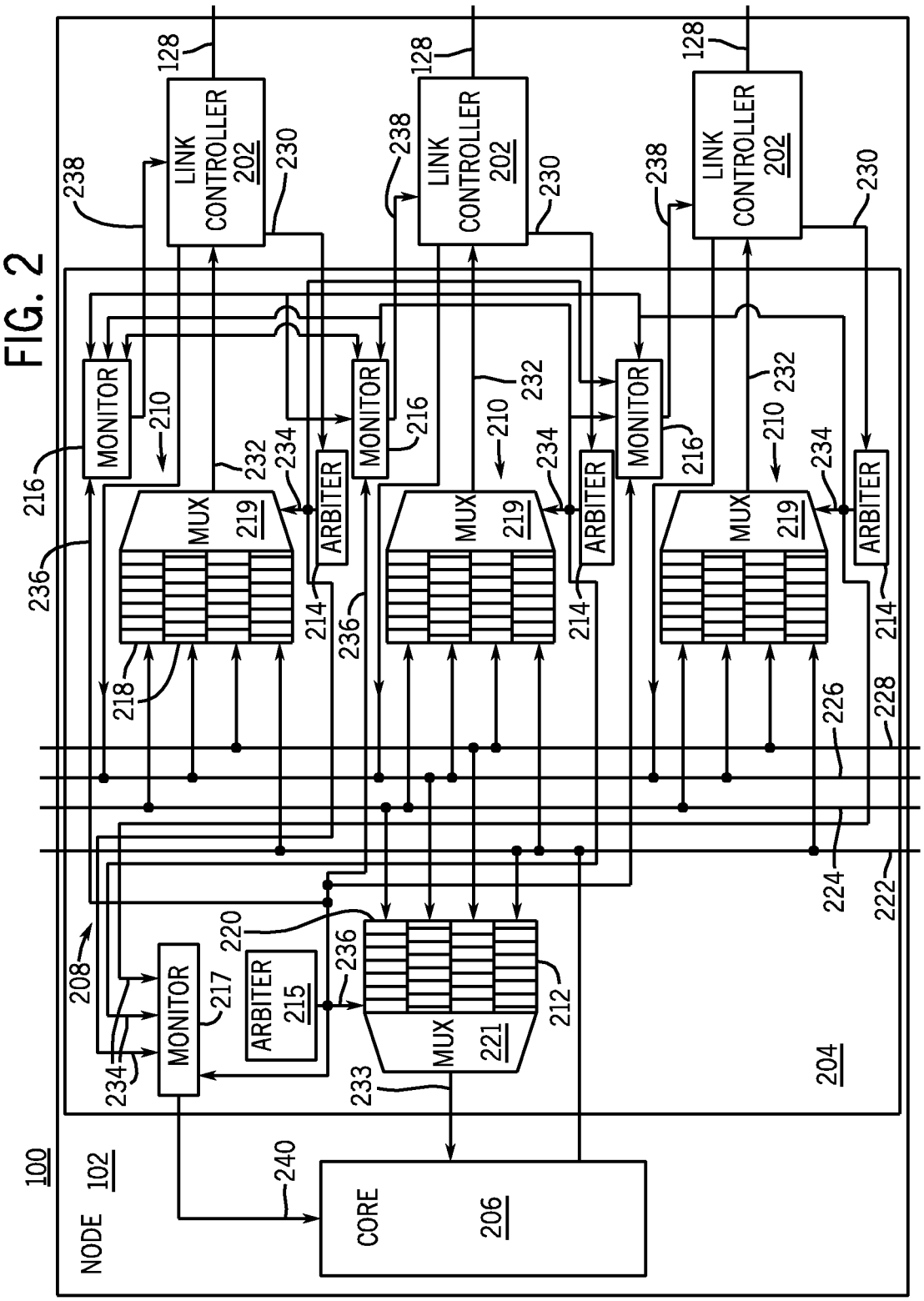
FIG. 2 is a representation of a node of an implementation of the apparatus of FIG. 1 and illustrates a plurality of ports, a plurality of link controllers, a switch block, and a core.

Turning to FIG. 2, the node 102 in an example comprises one or more ports 128, one or more link controllers (LCs) 202, one or more switch blocks 204, and one or more cores 206. The ports 128 and the link controllers 202 in an example are arranged in sets that comprise a one-to-one correspondence basis between the ports 128 and the link controllers 202. The link controller 202 in an example comprises logic that serves to handle sending and receiving of data and control information internal to and among the nodes 102, 104, 106, 108, 110, 112. The link controller 202 in an example performs signaling and handshaking of information over a port 128 and a path 124. In a further example, the link controller 202 may provide queuing of ingoing and outgoing information over a port 128 and a path 124 and control of traffic over a port 128 and a path 124, for example, depending on other activity within and/or outside the node 102. An exemplary link controller 202 may route transactions, data, traffic, and/or information to any of the remote queues 210 and/or local queues 212.

The core 206 in an example comprises circuitry configured to perform functions associated with the node 102 such as arithmetic and/or logical data processing, I/O processing, data storage, and/or the like. An exemplary core 206 comprises an interface, a processor, an interface for a processor, logic, logical block, protocol agent, and/or caching agent. In a further example, the core 206 may comprise a bridge device such as for interfacing with other parts of the system and/or system fabric and/or other systems and/or system fabrics.

Figure 4:
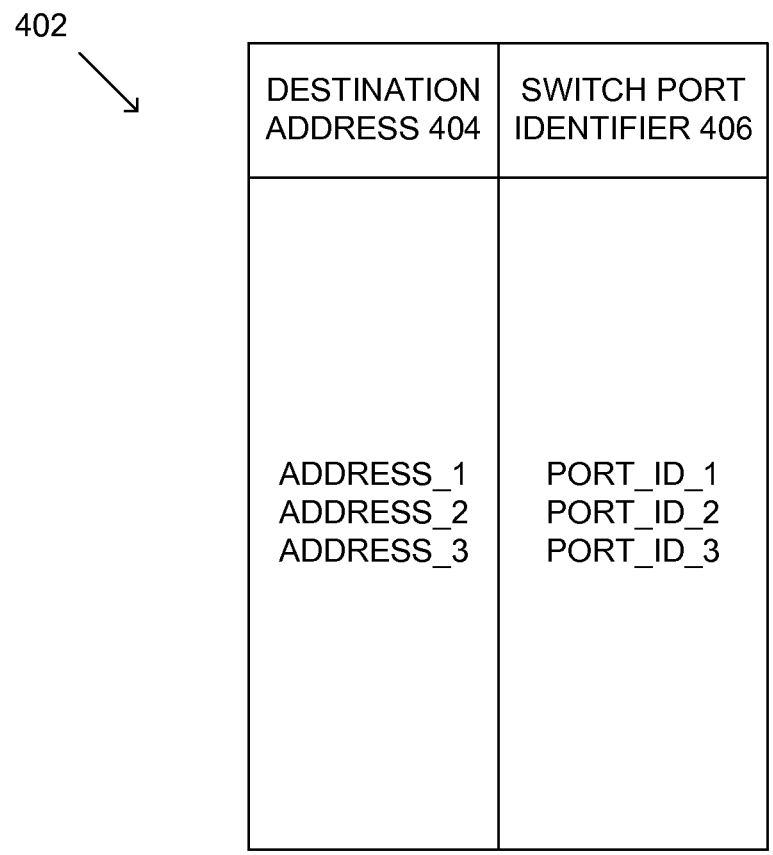
FIG. 4 is a representation of a table employable by the core of an implementation of the apparatus of FIG. 2.

Referring to FIGS. 2 and 4, an exemplary core 206 comprises and/or employs a table 402 such as a routing table. The table 402 in an example is programmable through employment of firmware. An exemplary table 402 comprises a destination address 404 and a switch port identifier 406. The destination address 404 in an example serves to designate and/or identify an address of a target and/or destination core 206 for a transaction, data, traffic, and/or information. The switch port identifier 406 in an example serves to identify the destination remote queue 210 or local queue 212 for routing of the transaction, data, traffic, and/or information. The switch 208 in an example comprises switch ports that are identified by the switch port identifiers 406, with the switch ports coupled and/or connected with other components such as the remote queue 210 and/or local queue 212. The core 206 in an example employs the table 402 to look up, review, and/or reference a requested, selected, targeted, and/or desired destination of a transaction, data, traffic, and/or information, for example, to decide how the transaction, data, traffic, and/or information is to reach and/or be routed to the requested, selected, targeted, and/or desired destination, as will be appreciated by those skilled in the art.

An exemplary implementation employs a switch network as the switch 208 to route transactions between switch ports for local and remote destinations in the remote and local queues 210, 212 on an end node as the node 102. Another exemplary implementation may implement queuing structures in other configurations that combine and/or share portions of the remote and local queues 210, 212, for example, provided that port arbitration by the arbiters 214, 215 can select between the remote and local queues 210, 212 such as based on the contents of the remote and local queues 210, 212 having come from remote or local sources. Exemplary local sources comprise cores 206 on the particular node 102. Exemplary remote sources comprise nodes 104, 106, 108, 110, 112 that are separate, different, distinct, and/or remote from the particular node 102. Exemplary sharing and/or combining of portions of the remote and local queues 210, 212 may serve to effectively reduce area for implementation of queuing structures for communicating transactions, data, traffic, and/or information.

The core 206 in an example follows, enforces, and/or conforms to an exemplary rule, parameter, constraint, limitation, and/or guide that the transaction, data, traffic, and/or information is to traverse at most a selected and/or limited number of, for example, two, hops of end nodes to reach the requested, selected, targeted, and/or desired destination. In an exemplary implementation with a limitation of two hops, a first hop may comprise an origination end node to a second end node, and a second hop may comprise the second end node to a destination end node. The core 206 in an example under an exemplary rule, parameter, constraint, limitation, and/or guide may allow the transaction, data, traffic, and/or information to traverse a selected and/or arbitrary number of switch components and/or nodes such as switches 118, 120, 122 while meeting the rule, parameter, constraint, and/or guide that at most the selected and/or limited number of, for example, two, hops of end nodes are traversed by the transaction, data, traffic, and/or information in reaching and/or being routed to the requested, selected, targeted, and/or desired destination.

An exemplary implementation comprises the core 206 that employs the table 402 on a single end node, on a selected number of end nodes, on a subset plurality of end nodes, on substantially all end nodes, or on all end nodes. Such end nodes in an example may comprise one or more of the nodes 102, 104, 106, 108, 110, 112. Such end nodes in an example may comprise the core 206 that employs the table 402 in connection with an exemplary rule, parameter, constraint, limitation, and/or guide that transactions, data, traffic, and/or information are to traverse at most a selected and/or limited number of, for example, two, hops of end nodes to reach the requested, selected, targeted, and/or desired destination. For example, on a given end node all the cores 206 employ the table 402, while other end nodes in an example may omit employment of the table 402 by the cores 206 on those end nodes. An exemplary implementation may promote avoidance of cycle deadlock and/or gridlock through employment of one or more relief points such as an end node as the node 102 that comprises a core 206 that employs the table 402 with the hop constraint along with additional employment by the link controller 202 of an almost-full signal as described herein. In an exemplary implementation, as long as one relief point exists in any given communication loop in a fabric then transactions, data, traffic, and/or information may drain from that communication loop.

The link controller 202 in an example employs the table 402 upon receipt of a transaction, data, traffic, and/or information through the associated port 128 and link 124. The table 402 allows the link controller 202 to determine which buffer 118, 120 in the remote or local queues 210, 212 should receive the transaction, data, traffic, and/or information. In another example, an initial employment by the core 206 upon origination of a transaction, data, traffic, and/or information may determine a full route through the fabric to transport sufficient detail in the transaction, data, traffic, and/or information to find a path through the fabric. Additional exemplary discussion of the table 402 is presented herein.

Referring to FIG. 2, the switch block 204 in an example serves to couple the link controllers 202 and the cores 206, for example, so that data may be sent from and/or received into the node 102, for example, over a number of the ports 128. The switch block 204 in an example comprises a switch 208, a plurality of memory locations, buffers and/or queues such as one or more remote queues 210 and one or more local queues 212, one or more arbiters 214, 215, and one or more monitors 216, 217. The remote queues 210 and the local queues 212 in an example may represent separate memory areas or may be incorporated into a single data storage area. For example, an exemplary physical location of the remote queues 210 and the local queues 212 may be in physically separate memories, or may be in shared memory, for example, partitioned for the remote queues 210 and the local queues 212.

An exemplary arbiter 214 is associated with a respective remote queue 210 and the link controller 202 coupled with the respective remote queue 210. In another exemplary implementation, a plurality of link controllers 202 on the node 102 may share a remote queue 210 in connection with routing between the link controllers 202. An exemplary arbiter 215 is associated with a respective local queue 212 and the core 206 coupled with the respective local queue 212. In another exemplary implementation, a plurality of cores 206 on the node 102 may share a local queue 212 in connection with routing between the cores 206. The switch 208 in an example comprises a switch element, connection network, crossbar switch, and/or wires that couple the cores 206, the remote queues 210, and the local queues 212.

An exemplary implementation comprises one or more virtual channels (not shown), for example, that may allow one or more transactions, data, traffic, and/or information to pass in route one or more other and/or adjacent transactions, data, traffic, and/or information. One or more, plural, and/or multiple instances and/or copies of the arbiters 214 and remote queues 210 may exist and/or be employed and/or one or more, plural, and/or multiple instances and/or copies of the arbiter 215 and local queues 212 may exist and/or be employed. An exemplary switch 208 may comprise a control signal that serves to indicate to a monitor 216, 217 which virtual channel is active, for example, through employment of time division multiplexing (TDM). Additional exemplary discussion of the monitors 216, 217 is presented herein.

The remote queues 210 and/or the local queues 212 in an example collect, receive, obtain, and/or hold transactions, data, traffic, and/or information delivered to the switch block 204. The remote queues 210 and/or the local queues 212 in an example collect, receive, obtain, and/or hold transactions, data, traffic, and/or information routed through the link controllers 202 from the ports 128 on the particular node 102, from ports 128 on other nodes 104, 106, 108, 110, 112, for example, through ports 128, link controllers 202, and cores 206 on the other nodes 104, 106, 108, 110, 112. In a further example, the remote queues 210 and/or the local queues 212 in an example collect, receive, obtain, and/or hold transactions, data, traffic, and/or information routed from the core 206 on the particular node 102. In a still further example, the remote queues 210 collect, receive, obtain, and/or hold transactions, data, traffic, and/or information routed from the core 206 through the switch 208 to be routed to through the link controllers 202 and out the ports 128 to other nodes 104, 106, 108, 110, 112.

An exemplary remote queue 210 comprises one or more buffers 218 such as FIFO (first-in, first-out) memories, a multiplexer (MUX) 219, and an output 232. The multiplexer 219 in an example serves to connect the contents and/or entries as the transactions, data, traffic, and/or information from the buffers 218, as the output 232 to an associated link controller 202, for example, under control and/or direction of a signal 234 from the arbiter 214 provided to the multiplexer 219. An exemplary plurality of buffers 218 is dedicated to corresponding possible sources for a transaction, data, traffic, and/or information, for example, a first core 206, a first port 128, a second port 128, or a third port 128 and respective first core signal 222, first port signal 224, second port signal 226, and third port signal 228.

An exemplary implementation comprises a remote queue 210 for each port 128 coupled with a communication link as a path 124. Each remote queue 210 in an example comprises a buffer 218 dedicated to a respective possible source for a transaction, data, traffic, and/or information routed through the switch 208, for example, the first core 206, the first port 128, the second port 128, or the third port 128. An exemplary implementation comprises a local queue 212 for each local destination, for example, a core 206, of data received over a communication link as a path 124. Each local queue 212 in an example comprises a buffer 220 dedicated to a respective possible source for a transaction, data, traffic, and/or information routed through the switch 208, for example, the first core 206, the first port 128, the second port 128, or the third port 128. In a further exemplary implementation, a number of separate and/or different cores 206 may share a same local queue 212.

A remote queue 210 or local queue 212 in an example exists to accommodate, serve, and/or facilitate communication between every source/destination pair. An exemplary set of six communication combination pairs comprises the first core 206 and the first port 128, the first core 206 and the second port 128, the first core 206 and the third port 128, the first port 128 and the second port 128, the first port 128 and the third port 128, and the second port 128 and the third port 128. The remote queue 210 in an example may collect data from an exemplary destination targeted by and/or associated with the remote queue 210, for example, for return of the data to the particular destination. In an exemplary implementation, a plurality of cores 206 on the node 102 may share a local queue 212 in connection with routing between the cores 206. In a further exemplary implementation, a plurality of link controllers 202 on the node 102 may share a remote queue 210 in connection with routing between the link controllers 202. Additional exemplary discussion of the remote queue 210 and the local queue 212 is presented herein.

Referring to FIGS. 2 and 4, an exemplary transaction, data, traffic, and/or information routed through the switch 208 comprises a header and/or a payload. An exemplary header serves to determine the type and/or destination of the transaction, data, traffic, and/or information. The header in an example comprises an address such as the destination address 404 that serves to designate and/or identify an address of a target and/or destination core 206 for the particular transaction, data, traffic, and/or information. The destination address 404 in an example is employable by the core 206 and/or link controller 202 to derive the switch port identifier 406 such as through employment of the table 402. The switch port identifier 406 in an example serves to identify the destination remote queue 210 or local queue 212, for example, on the switch 208, for routing of the transaction, data, traffic, and/or information.

An exemplary payload comprises particular data to be delivered and/or communicated in the transaction, data, traffic, and/or information. An exemplary short and/or abbreviated transaction comprises a header without an associated and/or accompanying payload. An exemplary remote queue 210 comprises logic that serves to decide and/or determine whether a match exists between the switch port identifier 406 and the particular remote queue 210, for example, when a valid signal (not shown) in an exemplary activated state may serve to indicate a transaction, data, traffic, and/or information is being sent on the switch 208, for example, in one or more given and/or particular clock cycles. An exemplary valid signal serves to indicate whether or not a transaction, data, traffic, and/or information is being sent on the switch 208, for example, so the remote queue 210 and/or local queue 212 in an example should review or ignore, for example, during the current time cycle, the signals available on the links and/or paths for transactions, data, traffic, and/or information. As will be appreciated by those skilled in the art, an exemplary valid signal may be carried and/or communicated on, over, and/or through employment of a link and/or path shown in FIG. 2 in connection with the switch 208 and/or on, over, and/or through employment of one or more additional and/or analogous links and/or paths such as for the switch 208. An exemplary valid signal in a deactivated state may serve to indicate one or more clock cycles without valid transactions, data, traffic, and/or information being sent on, over, and/or through employment of the switch 208. Upon a determination of a match between the port identifier 406 and the particular remote queue 210, the remote queue 210 in an example stores and/or collects the transaction, data, traffic, and/or information that comprises the particular header. Upon a determination of no match between the port identifier and/or address in the header and the particular remote queue 210, the remote queue 210 in an example ignores the transaction, data, traffic, and/or information that comprises the particular header, for example, with an exemplary possible and/or presumed expectation that another remote queue 210 will make a determination of a match for storage and/or collection therein of the transaction, data, traffic, and/or information that comprises the particular header.

Referring to FIG. 2, an exemplary local queue 212 comprises one or more buffers 220 such as FIFO (first-in, first-out) memories, a multiplexer (MUX) 221, and an output 233. The multiplexer 221 in an example serves to connect the contents and/or entries as the transactions, data, traffic, and/or information from the buffers 220, as the output 233 to an associated core 206, for example, under control and/or direction of a signal 236 from the arbiter 215 provided to the multiplexer 221. An exemplary plurality of buffers 220 is dedicated to corresponding possible sources for a transaction, data, traffic, and/or information, for example, the first core 206, the first port 128, the second port 128, or the third port 128.

The arbiter 214 in an example serves to select and/or decide which of the available transactions, data, traffic, and/or information in the remote queue 210 intended for other nodes 104, 106, 108, 110, 112 to next send and/or route to the link controller 202. An exemplary arbiter 214 reviews and/or looks at the status of the buffers 218 and determines and/or decides if the buffers 218 comprise a transaction, data, traffic, and/or information to be routed through the switch 208. Exemplary arbiters 214 operate independently of each other, for example, to independently act and/or operate in connection with their respective remote queues 210.

Figure 3:
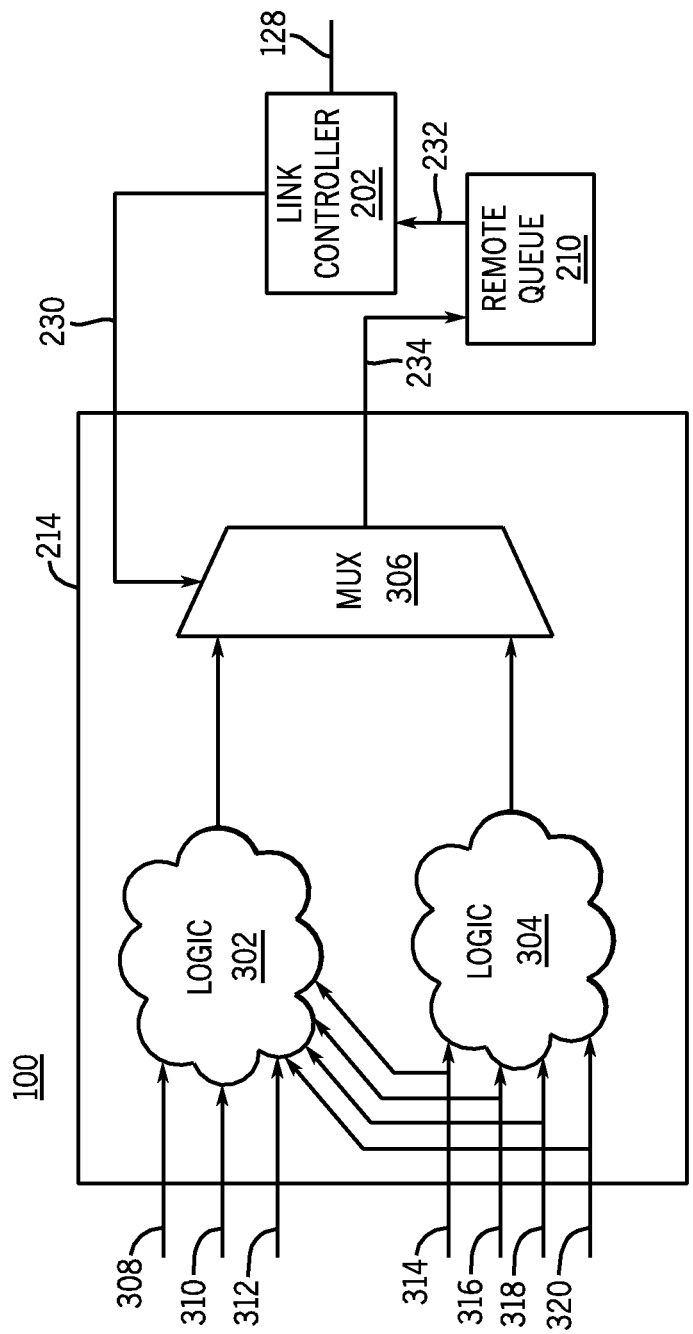
FIG. 3 is a representation of an arbiter associable with a queue of the switch block of an implementation of the apparatus of FIG. 2.

Referring to FIGS. 2 and 3, an exemplary arbiter 214 comprises one or more algorithms, procedures, programs, processes, mechanisms, engines, models, coordinators, modules, applications, code, and/or logic 302, 304 and one or more multiplexers (MUXes) 306. The arbiter 214 in an example comprises and/or implements an exemplary fair approach and an exemplary exception in connection with the transactions, data, traffic, and/or information of the buffers 218 of the remote queue 210 associated with the arbiter 214 for output 232 to the link controller 202. For example, in a general case such as with a round-robin approach and/or other arbitration and/or selected pattern, the arbiter 214 employs and/or implements an exception, accommodation, modification, and/or adjustment for consideration of a remote status signal 230, for example, input to the arbiter 214 from the associated link controller 202. As will be appreciated by those skilled in the art, an exemplary link and/or path that carries and/or communicates the remote status signal 230 in an example may serve to carry and/or communicate one or more additional signals.

Exemplary signals 308, 310, 312 as input to the arbiter 214 from the buffers 218 of the remote queue 210 in an example serve to indicate to the arbiter 214 that transactions, data, traffic, and/or information are available and/or requested from local sources such as respective cores 206 on the particular node 102 that is local to the arbiter 214. Exemplary signals 314, 316, 318, 320 as input to the arbiter 214 from the buffers 218 of the remote queue 210 in an example serve to indicate to the arbiter 214 that transactions, data, traffic, and/or information are available and/or requested from remote sources such as the nodes 104, 106, 108, 110, 112 that are separate, different, distinct, and/or remote from the particular node 102 that is local to the arbiter 214.

Signals 308, 310, 312 in an example correspond to respective buffers 218 in a given remote queue 210 for transactions, data, traffic, and/or information from respective local cores 206 on the local node 102. Signals 314, 316, 318, 320 in an example correspond to respective buffers 218 in a given remote queue 210 for transactions, data, traffic, and/or information from nodes 104, 106, 108, 110, 112 that are separate, different, distinct, and/or remote from the local node 102.

The multiplexer 306 in an example serves to select the logic 302 to determine the output 232 to the link controller 202 upon an exemplary deactivation, non-activation, and/or low level of the remote status signal 230, and serves to select the logic 304 to determine the output 232 to the link controller 202 upon an exemplary activation and/or high level of the remote status signal 230. One or more exemplary inputs to the logic 302 comprise signals 308, 310, 312 for transactions, data, traffic, and/or information of respective buffers 218 in the remote queue 210 for all and/or substantially all the local sources, for example, each of the respective cores 206 on the particular node 102; and signals 314, 316, 318, 320 for transactions, data, traffic, and/or information of respective buffers 218 in the remote queue 210 for all and/or substantially all the respective remote sources, for example, each of the nodes 104, 106, 108, 110, 112 that are separate, different, distinct, and/or remote from the particular node 102 that is local to the arbiter 214. An exemplary deactivation, non-activation, and/or low level of the remote status signal 230 serves to cause the remote queue 210 to pass to the link controller 202 as the output 232: transactions, data, traffic, and/or information of respective buffers 218 in the remote queue 210 for all and/or substantially all the local sources, for example, each of the respective cores 206 on the particular node 102, which transactions, data, traffic, and/or information were indicated by the signals 308, 310, 312 input to the logic 302; and transactions, data, traffic, and/or information of respective buffers 218 in the remote queue 210 for all and/or substantially all the respective remote sources, for example, each of the nodes 104, 106, 108, 110, 112 that are separate, different, distinct, and/or remote from the particular node 102 that is local to the arbiter 214, which transactions, data, traffic, and/or information were indicated by the signals 314, 316, 318, 320 input to the logic 302.

One or more exemplary inputs to the logic 304 comprise the signals 314, 316, 318, 320 for the transactions, data, traffic, and/or information of the respective buffers 218 in the remote queue 210 for all and/or substantially all the respective remote sources, for example, each of the nodes 104, 106, 108, 110, 112. An exemplary activation and/or high level of the remote status signal 230 serves to cause the remote queue 210 to pass to the link controller 202 as the output 232, transactions, data, traffic, and/or information of respective buffers 218 in the remote queue 210 for all and/or substantially all the respective remote sources, for example, each of the nodes 104, 106, 108, 110, 112 that are separate, different, distinct, and/or remote from the particular node 102 that is local to the arbiter 214, which transactions, data, traffic, and/or information were indicated by the signals 314, 316, 318, 320 input to the logic 302.

The logic 302 in an example comprises as exemplary input the signals 308, 310, 312, 314, 316, 318, 320 for the transactions, data, traffic, and/or information of all and/or substantially all the respective local and remote sources. The logic 304 in an example comprises as exemplary input the signals 314, 316, 318, 320 for the transactions, data, traffic, and/or information of all and/or substantially all the respective remote sources only. Upon an exemplary activation and/or high level of the remote status signal 230 and based on request signals 314, 316, 318, 320, the multiplexer 306 in an example employs the signal 234 from the logic 304 to select through employment of the multiplexer 219 the output 232 from the remote queue 210 to the link controller 202 the transactions, data, traffic, and/or information of all and/or substantially all the respective remote sources only. Upon an exemplary deactivation, and/or non-activation, and/or low level of the remote status signal 230 and based on request signals 308, 310, 312, 314, 316, 318, 320, the multiplexer 306 in an example employs the signal 234 from the logic 302 to select through employment of the multiplexer 219 the output 232 from the remote queue 210 to the link controller 202 the transactions, data, traffic, and/or information of all and/or substantially all the respective local and remote sources.

An exemplary arbiter 214 employs and/or implements a round-robin approach and/or other arbitration and/or selected pattern to determine, select, choose, receive, identify, and/or obtain the transactions, data, traffic, and/or information to be sent as the output 232. The arbiter 214 in an example employs the signals 308, 310, 312, 314, 316, 318, 320 as input to the logic 302 and/or 304 to determine, select, choose, receive, identify, and/or obtain as the output 232 the transactions, data, traffic, and/or information of all and/or substantially all the respective local and remote sources from the buffers 218 in the remote queue 210. The arbiter 214 in an example employs the remote status signal 230 such as in the multiplexer 306 to select output from the logic 304 under influence, direction, request, and/or guidance of the signals 314, 316, 318, 320 for the transactions, data, traffic, and/or information of all and/or substantially all the respective remote sources only, or output from the logic 302 under influence, direction, request, and/or guidance of the signals 308, 310, 312, 314, 316, 318, 320 for the transactions, data, traffic, and/or information of all and/or substantially all the respective local and remote sources.

The arbiter 215 in an example serves to select and/or decide which of the available transactions, data, traffic, and/or information in the local queue 212 intended for the particular node 102 to next send and/or route to the core 206. An exemplary arbiter 215 reviews and/or looks at the status of the buffers 220 and determines and/or decides if the buffers 220 comprise a transaction, data, traffic, and/or information to be routed to the core 206. Exemplary arbiters 215 operate independently of each other, for example, to independently act and/or operate in connection with their respective local queues 212. The arbiter 215 in an example comprises a fair approach in a general case, for example, a round-robin approach and/or other arbitration and/or selected pattern. An exemplary arbiter 215 omits a connection to a hypothetical remote status signal such as the remote status signal 230 because the arbiter 215 and the accompanying local queue 212 are associated with a local core 206 on a node 102, rather than a remote core 206 on another node 104, 106, 108, 110, 112. The arbiter 215 in an example may comprise and/or employ the logic 302, omit the logic 304, omit the multiplexer 306, and omit the remote status signal 230. In another example, such as where a core 206 may comprise a bridge device such as for interfacing with other systems and/or system fabrics, the arbiter 215 may comprise and/or employ the logic 302, the logic 304, the multiplexer 306, and the remote status signal 230, for example, where the output 232 may be connected and/or coupled from the multiplexer 306 to the associated core 206, as will be appreciated by those skilled in the art.

An exemplary remote status signal 230 comprises an indication that a downstream node 104 is becoming full, for example, with a threshold to accommodate delay time in communication, processing, employment, and/or interpretation of the remote status signal 230 to, by, and/or at an upstream node 102. An exemplary threshold for the remote status signal 230 comprises an indication of sufficient and/or extra room and/or space for additional transactions, data, traffic, and/or information at and/or shortly after the node 104 starts signaling. The threshold for the remote status signal 230 in an example comprises an alert that the remote queue 210 is running out of space and the upstream node 102 should modify the sending of new data to avoid a need to entirely stop sending new data.

The remote status signal 230 in an example serves to indicate to the arbiter 214 to send transactions, data, traffic, and/or information from only remote sources, not from local sources. For example, the arbiter 214 upon activation of the remote status signal 230 performs a round-robin approach and/or other arbitration and/or selected pattern in connection with transactions, data, traffic, and/or information received from only the other nodes 104, 106, 108, 110, 112, temporarily excluding from the round-robin approach and/or other arbitration and/or selected pattern, while the remote status signal 230 signal is active, any transactions, data, traffic, and/or information received from a core 206 on the local node 102. The remote status signal 230 in an example is employed in a modification of an algorithm, procedure, program, process, mechanism, engine, model, coordinator, module, application, code, and/or logic of the arbiter 214 to consider the remote status signal 230 in selecting which transaction, data, traffic, and/or information to next send to the link controller 202 and the associated port 128. An exemplary remote status signal 230 comprises an indication and/or information sent back upstream to an end node as the node 102 from a downstream end node as a node 104, 106, 108, 110, 112 for employment by the arbiter 214 at the upstream end node as the node 102 coupled with the path 124 to the port 128 associated with the link controller 202 coupled with the remote queue 210 associated with the particular arbiter 114 on the node 102.

The remote status signal 230 in an example comprises an indication from a downstream node 104 to an upstream node 102 whether the upstream node 102 can send any transaction, data, traffic, and/or information to the downstream node 104, or whether because the pass-through paths at the downstream node 104 are filling up, the upstream node 102 should send only transaction, data, traffic, and/or information that is expected to complete on the particular downstream node 104. An exemplary algorithm, procedure, program, process, mechanism, engine, model, coordinator, module, application, code, and/or logic of the arbiter 214 at the upstream node 102 upon activation of the remote status signal 230 by the downstream node 104 gives preference to transactions, data, traffic, and/or information that are completing and therefore exiting the fabric and opening space and/or room through and/or into which new and/or additional transactions, data, traffic, and/or information may flow. In an exemplary implementation, transactions, data, traffic, and/or information passed to a particular node 102 with a destination beyond that particular node 102 would be completing and/or closer to completing on the downstream node 104, for example, in view of an exemplary rule, parameter, constraint, limitation, and/or guide that transactions, data, traffic, and/or information are to traverse at most a selected and/or limited number of, for example, two, hops of end nodes to reach the requested, selected, targeted, and/or desired destination as followed, enforced, and/or conformed to by an exemplary core 206 upon origination thereof, as described herein.

Referring to FIG. 2, the arbiter 214 in an example provides input such as signal 234 to the remote queue 210. The arbiter 215 in an example provides input such as signal 236 to the local queue 212. The signals 234 and/or 236 in an example comprise control information, for example, to indicate to remote and/or local queue 210, 212 which one or more buffers 218, 220 are selected to drive the particular transaction, data, traffic, and/or information to the output 232, 233. An exemplary implementation sequentially and/or in round-robin fashion selects the particular transaction, data, traffic, and/or information as entries from the buffers 218, 220 as the output 232, 233. In an exemplary series of cycles, a given entry from the buffers 218, 220 could use the full or a portion of the bandwidth of the link and/or path. Another exemplary implementation may employ arbitration that serves to select one or more entries from the buffers 218, 220 that comprise transactions, data, traffic, and/or information, for example, that may be sent in parallel to the output 232, 233 such as for sharing of bandwidth. On an exemplary cycle, two or more entries from the buffers 218, 220 could each use half or another portion of the bandwidth of the link and/or path.

An exemplary monitor 216 comprises exemplary input of the signals 234 from all and/or substantially all the arbiters 214 on the node 102 and the signals 236 from all and/or substantially all the arbiters 215 on the node 102. An exemplary monitor 216 comprises exemplary output 238 for the link controller 202 that is associated with the particular monitor 216. As will be appreciated by those skilled in the art, an exemplary link and/or path that carries and/or communicates the output 238 in an example may serve to carry and/or communicate one or more additional signals. An exemplary monitor 217 comprises exemplary input of the signals 234 from all and/or substantially all the arbiters 214 on the node 102 and the signals 236 from all and/or substantially all the arbiters 215 on the node 102. As will be appreciated by those skilled in the art, one or more exemplary links and/or paths that carry and/or communicate the signals 234 and/or 236 in an example may serve to carry and/or communicate one or more additional signals. An exemplary monitor 217 comprises exemplary output 240 for the core 206 that is associated with the particular monitor 217. As will be appreciated by those skilled in the art, an exemplary link and/or path that carries and/or communicates the output 240 in an example may serve to carry and/or communicate one or more additional signals.

An exemplary output 238 from the monitor 216 to the link controller 202 comprises an indication of the fullness status of all and/or substantially all buffers 218 within the remote queues 210 on the particular node 102 and for all and/or substantially all the buffers 220 within the local queues 212 on the particular node 102, for example, that are fed, provided, allocated, and/or supplied transactions, data, traffic, and/or information by the link controller 202 associated with the monitor 216. If an exemplary link controller 202 makes a determination from the output 238 from the monitor 216 that any remote queue 210 and/or any local queue 212 is full and/or substantially full then the link controller 202 in an example considers and/or interprets all and/or substantially all the remote queues 210 and the local queues 212 to be full and/or substantially full, for example, since the link controller 202 cannot know which queue of the remote or local queues 210, 212 would be a requested, selected, targeted, and/or desired destination of a next and/or subsequent transaction, data, traffic, and/or information. The link controller 202 in an example upon making a determination from the output 238 from the monitor 216 that any remote queue 210 and/or any local queue 212 is full and/or substantially full proceeds to stop, prevent, end, cease, and/or halt all and/or substantially all routing of all and/or substantially all transactions, data, traffic, and/or information over and/or through the link controller 202.

For example, referring to FIGS. 1 and 2, the link controller 202 sends a completely-full signal from the port 128 associated with the particular link controller 202 on the node 102, across a link 124 to the port 128 on the node 104, 106, 108, 110, 112 directly coupled and/or connected with the particular port 128 on the node 102 across the link 124. Upon receipt of the completely-full signal across the link 124 on the port 128 of the node 104, 106, 108, 110, 112 directly coupled and/or connected with the node 102, the link controller 202 and/or the associated arbiter 214 on the particular node 104, 106, 108, 110, 112 stops, prevents, ends, ceases, and/or halts all and/or substantially all routing of all and/or substantially all transactions, data, traffic, and/or information over and/or through the particular link controller 202 and/or the associated arbiter 214 on the node 104, 106, 108, 110, 112 directly coupled and/or connected with the node 102 across the link 124.

In another example, the link controller 202 on the node 102 that originates the completely-full signal would keep the completely-full signal. The completely-full signal in an example would not be sent across the link 128. An exemplary implementation may omit support for sending of the completely-full signal across a link 128, for example, with a reliance and/or expectation the almost-full signal as described herein promotes an avoidance of cycle deadlock and/or gridlock through employment of one or more relief points such as an end node as the node 102 that comprises a core 206 that employs the table 402 with the hop constraint along with additional employment by the link controller 202 of the almost-full signal as a relief point in a given communication loop in the fabric for transactions, data, traffic, and/or information to drain from that communication loop. The link controller 202 on the particular node 102 in an example stalls delivery of new transactions, data, traffic, and/or information to the switch block 208 on the node 102. For example, the link controller 202 may prevent a valid signal (not shown) until an end of the completely-full signal. The link controller 202 may refrain from, avoid, and/or refuse to release space for additional transactions, data, traffic, and/or information until an end of the completely-full signal, for example, to prevent the link controller 202 on the node 104, 106, 108, 110, 112 directly coupled and/or connected with the node 102 from sending all and/or substantially all new and/or additional transactions, data, traffic, and/or information to the node 102 until an end of the completely-full signal.

An exemplary monitor 217 associated with a core 206 on the node 104, 106, 108, 110, 112 that receives the completely-full signal from the node 102 in an example employs the completely-full signal to stop, prevent, end, cease, and/or halt all and/or substantially all routing of all and/or substantially all transactions, data, traffic, and/or information from the particular core 206 to the remote queue 210 associated with the particular port 128 on the node 104, 106, 108, 110, 112 directly coupled and/or connected with the port 128 on the node 102 that sent the completely-full signal across the link 124.

In a further example, the link controller 202 may make a determination from the output 238 from the monitor 216 that any remote queue 210 and/or any local queue 212 has reached a targeted, sufficient, selected, and/or threshold fullness and the link controller 202 therefore sends the remote status signal 230 as the almost-full signal from the port 128 on the node 102 to the port 128 on the node 104, 106, 108, 110, 112 directly coupled and/or connected with the particular port 128 on the node 102. The remote status signal 230 in an example comprises an almost-full signal from the port 128 associated with the particular link controller 202 on the node 102, to the port 128 on the node 104, 106, 108, 110, 112 directly coupled and/or connected with the particular port 128 on the node 102, for transmission and/or routing from the port 128 on the node 104, 106, 108, 110, 112 through the associated link controller 202 to the arbiter 214, as represented in FIG. 2 on the node 102 and as will be appreciated by those skilled in the art as representative of the transmission on an exemplary node 104, 106, 108, 110, 112 that is separate, different, distinct, and/or remote from the particular node 102 that originates the remote status signal 230. For example, the link controller 202 from the output 238 from the monitor 216 may make a determination that a buffer 218, 220 on a queue such as any remote queue 210 and/or any local queue 212 has reached a targeted, sufficient, selected, and/or threshold fullness at an exemplary fullness of approximately forty, fifty, or sixty percent of total entries in the particular buffer 218, 220, and the link controller 202 may therefore send the remote status signal 230 as an almost-full signal from the port 128 on the node 102 to the port 128 on the node 104, 106, 108, 110, 112 directly coupled and/or connected with the particular port 128 on the node 102. Where a buffer 218, 220 comprises sixty-four entries, an exemplary link controller 202 may choose and/or determine to send and/or activate the remote status signal 230 when thirty-two entries of the particular buffer 218, 220 are full.

Figure 5:
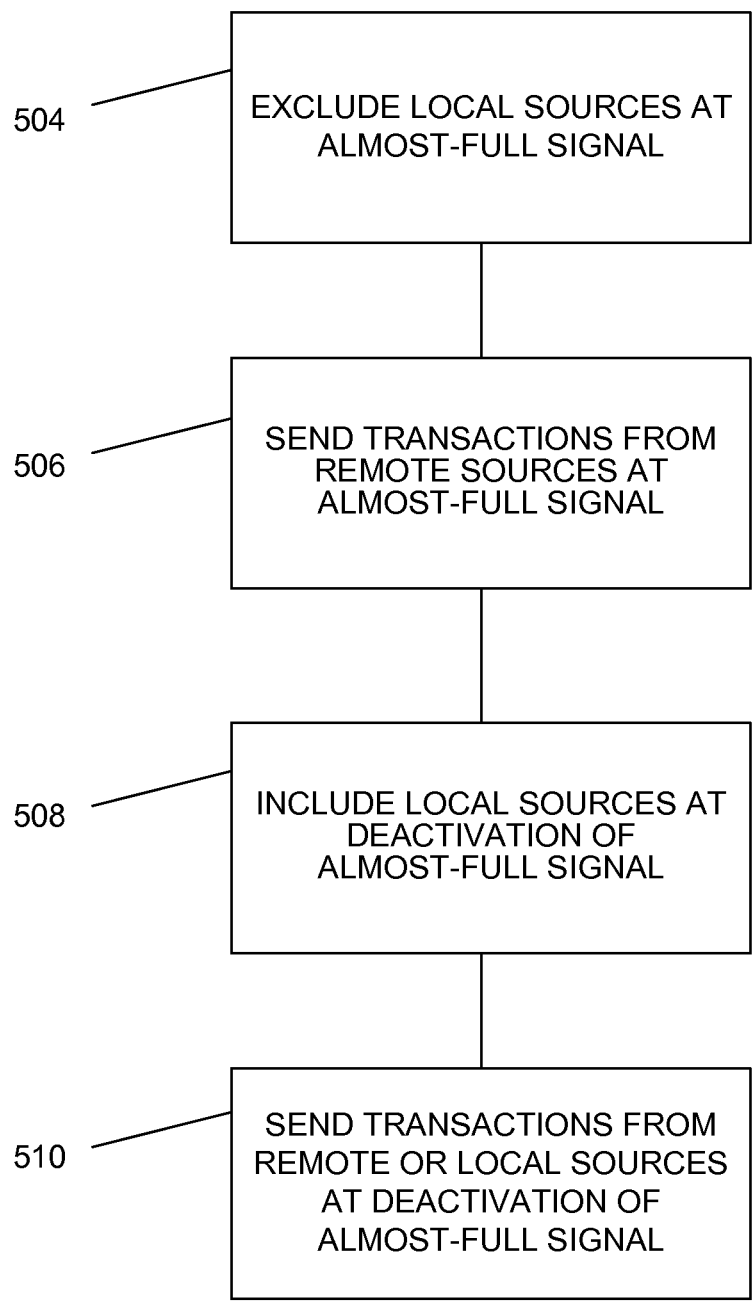
FIG. 5 is a representation of an exemplary logic flow for an end node as the node of an implementation of the apparatus of FIG. 2.

An illustrative description of an exemplary operation of an implementation of the apparatus 100 is presented, for explanatory purposes. FIG. 5 is a representation of an exemplary logic flow 502 for an upstream-communication end node as the node 102 that upon a receipt of an indication of threshold-partial fullness of transaction-storage space on a downstream-communication end node as the node 104 modifies transaction-selection for delivery to the downstream-communication end node as the node 104 to exclude one or more transactions originated on the upstream-communication end node as the node 102. The upstream-communication end node as the node 102 in an example upon the receipt of the indication of threshold-partial fullness of transaction-storage space on the downstream-communication end node as the node 104 proceeds to send to the downstream-communication end node as the node 104 all and/or substantially all transactions targeted for delivery to the downstream-communication end node as the node 104 and received by the upstream-communication end node as the node 102 from one or more additional end nodes as the node 106, 108, 110, 112 only.

STEP 504 in an example excludes local sources at almost-full signal. The upstream-communication end node as the node 102 in an example excludes from transaction-selection for delivery to the downstream-communication end node as the node 104 all and/or substantially all transactions originated on the upstream-communication end node as the node 102 and targeted for delivery to the downstream-communication end node as the node 104. STEP 506 in an example sends transactions from remote sources at almost-full signal. The upstream-communication end node as the node 102 in an example sends to the downstream-communication end node all and/or substantially all transactions targeted for delivery to the downstream-communication end node as the node 104 and received by the upstream-communication end node as the node 102 from one or more additional end nodes as the nodes 106, 108, 110, 112.

STEP 508 in an example includes local sources at deactivation of almost-full signal. Upon a non-activation of a signal of threshold-partial fullness of transaction-storage space on the downstream-communication end node as the node 104 the upstream-communication end node as the node 102 in an example proceeds to send to the downstream-communication end node as the node 104 all and/or substantially all the transactions originated on the upstream-communication end node as the node 102 and targeted for delivery to the downstream-communication end node as the node 104. STEP 510 in an example sends transactions from remote sources or local sources at deactivation of almost-full signal. The upstream-communication end node as the node 102 in an example proceeds to send to the downstream-communication end node as the node 104 all and/or substantially all the transactions targeted for delivery to the downstream-communication end node as the node 104 and received by the upstream-communication end node as the node 102 from the one or more additional end nodes as the nodes 106, 108, 110, 112.

In an exemplary implementation, decisions concerning when a transaction may be transported over a particular communication link 124 are determined by way of control information passed among the nodes 102, 104, 106, 108, 110, 112. The nodes 102, 104, 106, 108, 110, 112 in an example control how many transactions, or how much data, the particular node may receive over a particular path 124 and ports 128. This control in an example employs an indication of the amount of free space available in a data storage area such as a remote queue 210 and/or local queue 212 at any particular point in time. Exemplary control information exists in the form of permissions and/or credits that may be passed from a receiving node, such as node 104, 106, 108, 110, 112, to a sending node such as node 102 coupled with the receiving node by way of a path 124 and ports 128. Each number of permissions and/or credits in an example indicates the amount of information the receiving node has allocated for receipt from the sending node. Each permission and/or credit in an example corresponds to a predetermined amount of data, such a transaction or a portion thereof, so that for each time that amount of data is issued by the sending node to the receiving node, the sending node decrements the permission and/or credit count the sending node maintains for that receiving node. As an exemplary result, once the number of permissions and/or credits reaches zero or some other minimum level, the sending node in an example ceases sending more data to the receiving node until the receiving node issues more credits to the sending node. These new permissions and/or credits in an example serve to indicate that the receiving node has freed up some available local data storage in a remote queue 210 or local queue 212, thus allowing some of the storage to be allocated for more data from the sending node.

Referring to FIGS. 1 and 2, an exemplary implementation allows a node 102 to understand whether a next node 104 to which the node 102 would potentially route a transaction, comprises sufficient room in the remote queues 210 of node 104 to accept a transaction for routing through node 104 to a subsequent node 106. If there is sufficient room at node 104, then node 102 in an example understands that node 104 may accept any transaction. If there is insufficient room at node 104, then node 102 in an example passes to node 104 only transactions that node 102 has received from another node 106, 108 and node 102 will not initiate a new transaction from node 102 to be routed to node 104, or through node 104 to node 106, 108.

An exemplary implementation allows and/or substantially always allows transactions to drain from the fabric of the apparatus 100. An exemplary implementation may avoid a deadlock and/or gridlock scenario such as may otherwise exist in grid-type topologies. An exemplary implementation allows a pass through at node 102 of a transaction from node 106, 108 that will complete at node 104. Upon an understanding of increased concern over and/or heightened space constraints at node 104, an exemplary implementation chooses a pass through at node 102 of a transaction from node 106, 108 that will complete at node 104 over a new transaction from node 102.

Node 104 in an example checks the status of buffers 218, 220 of the remote and/or local queues 210, 212 that comprise transactions targeted for the core 206 and/or local, for example, on chip, destinations on the node 104 and the separate status of buffers 218, 220 of the remote and/or local queues 210, 212 that comprise transactions targeted for other nodes 106, 108. Node 104 in an example makes a determination whether the remote and/or local queues 210, 212 that track transactions targeted for other nodes are becoming full and are at risk to completely fill and block further progress. Node 104 in an example passes an indication of this status through a path 124 as a communication link with node 102. Node 102 in an example applies and/or reviews this status from node 104 to recognize and/or make a determination when node 102 should refrain and/or stop originating, sourcing, and/or initiating new transactions that may need to pass through node 104 and should forward to node 104 only transactions that are routed through node 102 from other nodes 106, 108 and which therefore terminate on node 104.

An exemplary implementation comprises an upstream-communication end node (e.g., node 102) that upon a receipt of an indication (e.g., remote status signal 230) of threshold-partial fullness of transaction-storage space (e.g., remote and/or local queue 210, 212) on a downstream-communication end node (e.g., node 104) modifies transaction-selection for delivery to the downstream-communication end node (e.g., node 104) to exclude one or more transactions originated on the upstream-communication end node (e.g., node 102).

The receipt of the indication (e.g., remote status signal 230) of threshold partial fullness of transaction-storage space (e.g., remote and/or local queue 210, 212) on the downstream-communication end node (e.g., node 104) corresponds to an activation of a signal (e.g., remote status signal 230) of threshold partial fullness of transaction storage space (e.g., remote and/or local queue 210, 212) on the downstream-communication end node (e.g., node 104). A non receipt of the signal (e.g., remote status signal 230) of threshold partial fullness of transaction-storage space (e.g., remote and/or local queue 210, 212) on the downstream-communication end node (e.g., node 104) corresponds to a non-threshold fullness and/or selected-sufficiency of availability of transaction-storage space (e.g., remote and/or local queue 210, 212) on the downstream-communication end node (e.g., node 104). The upstream-communication end node (e.g., node 102) upon the activation of the signal (e.g., remote status signal 230) of threshold partial fullness of transaction-storage space (e.g., remote and/or local queue 210, 212) on the downstream-communication end node (e.g., node 104) proceeds to: exclude from transaction-selection for delivery to the downstream-communication end node (e.g., node 104) all and/or substantially all transactions originated on the upstream-communication end node (e.g., node 102) and targeted for delivery to the downstream-communication end node (e.g., node 104); and send to the downstream-communication end node (e.g., node 104) all and/or substantially all transactions targeted for delivery to the downstream-communication end node (e.g., node 104) and received by the upstream-communication end node (e.g., node 102) from one or more additional end nodes (e.g., nodes 106, 108, 110, 112).

The upstream-communication end node (e.g., node 102) upon the non-activation of the signal (e.g., remote status signal 230) of threshold partial fullness of transaction-storage space (e.g., remote and/or local queue 210, 212) on the downstream-communication end node (e.g., node 104) proceeds to: send to the downstream-communication end node (e.g., node 104) all and/or substantially all the transactions originated on the upstream-communication end node (e.g., node 102) and targeted for delivery to the downstream-communication end node (e.g., node 104); and send to the downstream-communication end node (e.g., node 104) all and/or substantially all the transactions targeted for delivery to the downstream-communication end node (e.g., node 104) and received by the upstream-communication end node (e.g., node 102) from the one or more additional end nodes (e.g., nodes 106, 108, 110, 112).

The downstream-communication end node (e.g., node 104) determines an activation or a non-activation of the signal (e.g., remote status signal 230) of threshold partial fullness of transaction-storage space (e.g., remote and/or local queue 210, 212) on the downstream-communication end node (e.g., node 104). The upstream-communication end node (e.g., node 102) is coupled with the downstream-communication end node (e.g., node 104) for a receipt of the activation or the non-activation of the signal (e.g., remote status signal 230) of threshold partial fullness of transaction storage space (e.g., remote and/or local queue 210, 212) on the downstream-communication end node (e.g., node 104).

The upstream-communication end node (e.g., node 102) upon the receipt of the indication (e.g., remote status signal 230) of threshold-partial fullness of transaction-storage space (e.g., remote and/or local queue 210, 212) on the downstream-communication end node (e.g., node 104) proceeds to send to the downstream-communication end node (e.g., node 104) only all and/or substantially all transactions targeted for delivery to the downstream-communication end node (e.g., node 104) and received by the upstream-communication end node (e.g., node 102) from one or more additional end nodes (e.g., nodes 106, 108, 110, 112). The upstream-communication end node (e.g., node 102) upon a non-receipt of the indication (e.g., remote status signal 230) of threshold-partial fullness of transaction-storage space (e.g., remote and/or local queue 210, 212) on the downstream-communication end node (e.g., node 104) proceeds to send to the downstream-communication end node (e.g., node 104): all and/or substantially all the transactions targeted for delivery to the downstream-communication end node (e.g., node 104) and received by the upstream-communication end node (e.g., node 102) from the one or more additional end nodes (e.g., nodes 106, 108, 110, 112); and all and/or substantially all transactions originated on the upstream-communication end node (e.g., node 102) and targeted for delivery to the downstream-communication end node (e.g., node 104).

The upstream-communication end node (e.g., node 102) and the downstream-communication end node (e.g., node 104) are each capable of serving as a final destination 102, 104 of a transaction if the transaction is targeted thereto. The upstream-communication end node (e.g., node 102) and the downstream-communication end node (e.g., node 104) each conform to a constraint that all and/or substantially all transactions originated therefrom are to traverse at most a limited number of hops of end nodes (e.g., nodes 102, 104, 106, 108, 110, 112) to reach a targeted destination. The upstream-communication end node (e.g., node 102) and the downstream-communication end node (e.g., node 104) each conform to a constraint that all transactions originated therefrom are to traverse at most two hops of end nodes (e.g., nodes 102, 104, 106, 108, 110, 112) to reach a targeted destination. Each end node (e.g., node 102), 104, 106, 108, 110, 112 counted under the constraint is capable of serving as a final destination of a transaction if the transaction is targeted thereto.

A plurality of end nodes (e.g., nodes 102, 104, 106, 108, 110, 112) comprises the upstream-communication end node (e.g., node 102), the downstream-communication end node (e.g., node 104), and one or more additional end nodes (e.g., nodes 106, 108, 110, 112). Only one end node of the plurality of end nodes (e.g., nodes 102, 104, 106, 108, 110, 112) conforms to a constraint that all and/or substantially all transactions originated therefrom are to traverse at most a limited number of hops of end nodes (e.g., nodes 102, 104, 106, 108, 110, 112) to reach a targeted destination.

A plurality of end nodes (e.g., nodes 102, 104, 106, 108, 110, 112) comprises the upstream-communication end node (e.g., node 102), the downstream-communication end node (e.g., node 104), and one or more additional end nodes (e.g., nodes 106, 108, 110, 112). A subset of end nodes of the plurality of end nodes (e.g., nodes 102, 104, 106, 108, 110, 112) conforms to a constraint that all and/or substantially all transactions originated therefrom are to traverse at most a limited number of hops of end nodes (e.g., nodes 102, 104, 106, 108, 110, 112) to reach a targeted destination.

An exemplary approach makes a determination that transaction-storage space (e.g., remote and/or local queue 210, 212) of a downstream-communication end node (e.g., node 104) has reached a threshold-partial fullness. An indication (e.g., remote status signal 230) of the threshold-partial fullness is communicated to an upstream-communication end node (e.g., node 102) contemporaneous with continuation of acceptance of one or more additional transactions at the downstream-communication end node (e.g., node 104).

A determination is made that transaction-storage space (e.g., remote and/or local queue 210, 212) of the downstream-communication end node (e.g., node 104) has reached a threshold-partial fullness that will accommodate a delay time in communication, processing, employment, and/or interpretation of the indication (e.g., remote status signal 230) of the threshold-partial fullness to, by, and/or at the upstream-communication end node (e.g., node 102) through allowance of sufficient and/or extra room and/or space for one or more of the one or more additional transactions in the transaction storage space (e.g., remote and/or local queue 210, 212) of the downstream-communication end node (e.g., node 104) upon communication of the indication (e.g., remote status signal 230) of the threshold-partial fullness to the upstream-communication end node (e.g., node 102).

The indication (e.g., remote status signal 230) of the threshold-partial fullness is communicated to the upstream-communication end node (e.g., node 102) as an alert that the transaction-storage space (e.g., remote and/or local queue 210, 212) of the downstream-communication end node (e.g., node 104) is sufficiently occupied that the upstream-communication end node (e.g., node 102) should modify transaction-sending from the upstream-communication end node (e.g., node 102) to the downstream-communication end node (e.g., node 104) to avoid a need to entirely stop the transaction sending from the upstream-communication end node (e.g., node 102) to the downstream-communication end node (e.g., node 104).

A signal (e.g., remote status signal 230) of threshold partial fullness of transaction storage space (e.g., remote and/or local queue 210, 212) on the downstream-communication end node (e.g., node 104) is activated to cause the upstream-communication end node (e.g., node 102) to: exclude from transaction-selection for delivery to the downstream-communication end node (e.g., node 104) all and/or substantially all transactions originated on the upstream-communication end node (e.g., node 102) and targeted for delivery to the downstream-communication end node (e.g., node 104); and send to the downstream-communication end node (e.g., node 104) as the one or more additional transactions all and/or substantially all transactions targeted for delivery to the downstream-communication end node (e.g., node 104) and received by the upstream-communication end node (e.g., node 102) from one or more additional end nodes (e.g., nodes 106, 108, 110, 112).

A determination is made that transaction-storage space (e.g., remote and/or local queue 210, 212) of the downstream-communication end node (e.g., node 104) does not reach the threshold-partial fullness. The signal (e.g., remote status signal 230) of threshold partial fullness of transaction storage space (e.g., remote and/or local queue 210, 212) on the downstream-communication end node (e.g., node 104) is deactivated to cause the upstream-communication end node (e.g., node 102) to: send to the downstream-communication end node (e.g., node 104) all and/or substantially all the transactions originated on the upstream-communication end node (e.g., node 102) and targeted for delivery to the downstream-communication end node (e.g., node 104); and send to the downstream-communication end node (e.g., node 104) all and/or substantially all the transactions targeted for delivery to the downstream-communication end node (e.g., node 104)

and received by the upstream-communication end node (e.g., node 102) from the one or more additional end nodes (e.g., nodes 106, 108, 110, 112).

An exemplary approach sends from an upstream-communication end node (e.g., node 102) to a downstream-communication end node (e.g., node 104), contemporaneous with and notwithstanding receipt of an indication (e.g., remote status signal 230) of threshold-partial fullness of transaction-storage space (e.g., remote and/or local queue 210, 212) of the downstream-communication end node (e.g., node 104), one or more transactions targeted for delivery to the downstream-communication end node (e.g., node 104) and received by the upstream-communication end node (e.g., node 102) from one or more additional end nodes (e.g., nodes 106, 108, 110, 112).

Exclusive preference upon receipt of the indication (e.g., remote status signal 230) of threshold-partial fullness of transaction-storage space (e.g., remote and/or local queue 210, 212) of the downstream-communication end node (e.g., node 104), is given to the one or more transactions targeted for delivery to the downstream-communication end node (e.g., node 104) and received by the upstream-communication end node (e.g., node 102) from one or more additional end nodes (e.g., nodes 106, 108, 110, 112), over one or more transactions originated on the upstream-communication end node (e.g., node 102) and targeted for delivery to the downstream-communication end node (e.g., node 104).

From the upstream-communication end node (e.g., node 102) to the downstream-communication end node (e.g., node 104) contemporaneous with receipt of an indication of an unmet threshold-partial fullness of transaction-storage space (e.g., remote and/or local queue 210, 212) of the downstream-communication end node (e.g., node 104) are sent: one or more additional transactions targeted for delivery to the downstream-communication end node (e.g., node 104) and received by the upstream-communication end node (e.g., node 102) from the one or more additional end nodes (e.g., nodes 106, 108, 110, 112); and the one or more transactions originated on the upstream-communication end node (e.g., node 102) and targeted for delivery to the downstream-communication end node (e.g., node 104).

An implementation of the apparatus 100 in an example comprises a plurality of components such as one or more of electronic components, mechanical components, hardware components, and/or computer software components. A number of such components can be combined or divided in an implementation of the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art.

In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. In one or more exemplary implementations, one or more features described herein in connection with one or more nodes 102, 104, 106, 108, 110, 112 and/or one or more parts thereof are applicable and/or extendible analogously to one or more of the others and/or one or more other instances of nodes in the apparatus 100. In one or more exemplary implementations, one or more features described herein in connection with one or more nodes 102, 104, 106, 108, 110, 112 and/or one or more parts thereof may be omitted from or modified in one or more of the others and/or one or more other instances of nodes in the apparatus 100. In one or more exemplary implementations, one or more features described herein in connection with one or more switches 118, 120, 122, if any, and/or one or more parts thereof are applicable and/or extendible analogously to one or more of the others, if any, and/or one or more other instances of switches, if any, in the apparatus 100. In one or more exemplary implementations, one or more features described herein in connection with one or more switches 118, 120, 122, if any, and/or one or more parts thereof may be omitted from or modified in one or more of the others, if any, and/or one or more other instances of switches, if any, in the apparatus 100. In one or more exemplary implementations, one or more features described herein in connection with one or more paths 124 and/or one or more parts thereof are applicable and/or extendible analogously to one or more of the others and/or one or more other instances of paths in the apparatus 100. In one or more exemplary implementations, one or more features described herein in connection with one or more paths 124 and/or one or more parts thereof may be omitted from or modified in one or more of the others and/or one or more other instances of paths in the apparatus 100.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises a recordable data storage medium. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
an upstream-communication end node that upon a receipt of an indication of threshold-partial fullness of transaction-storage space on a downstream-communication end node modifies transaction-selection for delivery to the downstream-communication end node to exclude all transactions originated on the upstream-communication end node,
wherein the upstream-communication end node upon the receipt of the indication of threshold-partial fullness of transaction-storage space on the downstream-communication end node proceeds to send to the downstream-communication end node only all transactions targeted for final delivery to the downstream-communication end node and received by the upstream-communication end node from one or more additional end nodes and exclude from sending to the downstream-communication end node transactions originated on the upstream-communication end node,
wherein the upstream-communication end node, the downstream-communication end node, and the one or more additional end nodes are each configured to serve as a final destination for transactions, and
wherein each transaction comprises a header including an address identifying a final destination for the transaction and a payload including data to be delivered to the final destination.

2. The apparatus of claim 1, wherein the receipt of the indication of threshold-partial fullness of transaction-storage space on the downstream-communication end node corresponds to an activation of a signal of threshold-partial fullness of transaction-storage space on the downstream-communication end node, and wherein a non-receipt of the signal of threshold-partial fullness of transaction-storage space on the downstream-communication end node corresponds to at least one of a non-threshold fullness and selected-sufficiency of availability of transaction-storage space on the downstream-communication end node.

3. The apparatus of claim 2, wherein the upstream-communication end node upon the non-activation of the signal of threshold-partial fullness of transaction-storage space on the downstream-communication end node proceeds to:
send to the downstream-communication end node all the transactions originated on the upstream-communication end node and targeted for delivery to the downstream-communication end node; and
send to the downstream-communication end node all the transactions targeted for delivery to the downstream-communication end node and received by the upstream-communication end node from the one or more additional end nodes.

4. The apparatus of claim 2 in combination with the downstream-communication end node, wherein the downstream-communication end node determines an activation or a non-activation of the signal of threshold-partial fullness of transaction-storage space on the downstream-communication end node, wherein the upstream-communication end node is coupled with the downstream-communication end node for a receipt of the activation or the non-activation of the signal of threshold-partial fullness of transaction-storage space on the downstream-communication end node.

5. The apparatus of claim 1, wherein the upstream-communication end node and the downstream-communication end node each conform to a constraint that one or more transactions originated therefrom are to traverse at most a limited number of hops of end nodes to reach a targeted destination.

6. The apparatus of claim 5, wherein the upstream-communication end node and the downstream-communication end node each conform to a constraint that all transactions originated therefrom are to traverse at most two hops of end nodes to reach a targeted destination.

7. The apparatus of claim 5, wherein each end node counted under the constraint is capable of serving as a final destination of a transaction if the transaction is targeted thereto.

8. The apparatus of claim 1 in combination with the downstream-communication end node, the apparatus further comprising a plurality of end nodes that comprises the upstream-communication end node, the downstream-communication end node, and the one or more additional end nodes; wherein only one end node of the plurality of end nodes conforms to a constraint that all transactions originated therefrom are to traverse at most a limited number of hops of end nodes to reach a targeted destination.

9. The apparatus of claim 1 in combination with the downstream-communication end node, the apparatus further comprising a plurality of end nodes that comprises the upstream-communication end node, the downstream-communication end node, and the one or more additional end nodes; wherein a subset of end nodes of the plurality of end nodes conforms to a constraint that all transactions originated therefrom are to traverse at most a limited number of hops of end nodes to reach a targeted destination.

10. The apparatus of claim 1, wherein the upstream-communication end node, the downstream-communication end node, and the one or more additional end nodes each comprise a processor, a routing table employed by the processor to determine how transactions are to be routed to destinations, and a link controller to handle sending and receiving data and control information internal to and among the end nodes.

11. A method comprising:
making a determination that transaction-storage space of a downstream-communication end node has reached a threshold-partial fullness; and
communicating an indication of the threshold-partial fullness to an upstream-communication end node contemporaneous with continuation of acceptance of one or more additional transactions at the downstream-communication end node,
wherein communicating the indication of the threshold-partial fullness comprises:
activating a signal of threshold-partial fullness of transaction-storage space on the downstream-communication end node to cause the upstream-communication end node to:
exclude from transaction-selection for delivery to the downstream-communication end node all transactions originated on the upstream-communication end node and targeted for final delivery to the downstream-communication end node or to be routed through the downstream-communication end node; and
send to the downstream-communication end node as the one or more additional transactions all transactions targeted for final delivery to the downstream-communication end node and received by the upstream-communication end node from one or more additional end nodes, and
wherein the upstream-communication end node, the downstream-communication end node, and the one or more additional end nodes are each configured to serve as a final destination for transactions, and wherein each transaction comprises a header including an address identifying a final destination for the transaction and a payload including data to be delivered to the final destination.

12. The method of claim 11, wherein making the determination comprises:

making a determination that transaction-storage space of the downstream-communication end node has reached a threshold-partial fullness that will accommodate a delay time in at least one of communication, processing, employment, and interpretation of the indication of the threshold-partial fullness to, by, or at the upstream-communication end node through allowance of at least one of sufficient room, extra room, and space for one or more of the one or more additional transactions in the transaction-storage space of the downstream-communication end node upon communication of the indication of the threshold-partial fullness to the upstream-communication end node.

13. The method of claim 11, wherein communicating the indication of the threshold-partial fullness comprises:

communicating the indication of the threshold-partial fullness to the upstream-communication end node as an alert that the transaction-storage space of the downstream-communication end node is sufficiently occupied that the upstream-communication end node should modify transaction-sending from the upstream-communication end node to the downstream-communication end node to avoid a need to entirely stop the transaction-sending from the upstream-communication end node to the downstream-communication end node.

14. The method of claim 11, further comprising:

making a determination that transaction-storage space of the downstream-communication end node does not reach the threshold-partial fullness; and deactivating the signal of threshold-partial fullness of transaction-storage space on the downstream-communication end node to cause the upstream-communication end node to:

send to the downstream-communication end node all the transactions originated on the upstream-communication end node and targeted for final delivery to the downstream-communication end node or to be routed through the downstream-communication end node; and send to the downstream-communication end node all the transactions targeted for final delivery to the downstream-communication end node and received by the upstream-communication end node from the one or more additional end nodes.

15. The method of claim 11, wherein the upstream-communication end node, the downstream-communication end node, and the one or more additional end nodes each employ a routing table via a processor to determine how transactions are to be routed to destinations, and each handle sending and receiving data and control information internal to and among the end nodes via a link controller.

16. A method comprising:

sending from an upstream-communication end node to a downstream-communication end node, contemporaneous with and notwithstanding receipt of an indication of threshold-partial fullness of transaction-storage space of the downstream-communication end node, one or more transactions targeted for delivery to the downstream-communication end node and received by the upstream-communication end node from one or more additional end nodes, wherein the sending comprises:

giving exclusive preference upon receipt of the indication of threshold-partial fullness of transaction-storage space of the downstream-communication end node, to the one or more transactions targeted for final delivery to the downstream-communication end node and received by the upstream-communication end node from one or more additional end nodes, over one or more transactions originated on the upstream-communication end node and targeted for final delivery to the downstream-communication end node or to be routed through the downstream-communication end node, and wherein the upstream-communication end node, the downstream-communication end node, and the one or more additional end nodes are each configured to serve as a final destination for transactions, and wherein each transaction comprises a header including an address identifying a final destination for the transaction and a payload including data to be delivered to the final destination.

17. The method of claim 16, further comprising:

sending from the upstream-communication end node to the downstream-communication end node contemporaneous with receipt of an indication of an unmet threshold-partial fullness of transaction-storage space of the downstream-communication end node:

one or more additional transactions targeted for final delivery to the downstream-communication end node and received by the upstream-communication end node from the one or more additional end nodes; and the one or more transactions originated on the upstream-communication end node and targeted for final delivery to the downstream-communication end node or to be routed through the downstream-communication end node.

18. The method of claim 16, wherein the upstream-communication end node, the downstream-communication end node, and the one or more additional end nodes each employ a routing table via a processor to determine how transactions are to be routed to destinations, and each handle sending and receiving data and control information internal to and among the end nodes via a link controller.

* * * * *